United States Patent [19]
Trant et al.

[11] Patent Number: 6,002,236
[45] Date of Patent: Dec. 14, 1999

[54] LOCKABLE STORAGE CRADLE FOR BATTERY-OPERATED ELECTRONIC DEVICE

[75] Inventors: Edward Trant, Ridge; Robert Doran, East Setauket; Philip W. Swift, Port Jefferson; Carl Thelemann, East Islip, all of N.Y.

[73] Assignee: Symbol Technologies, Inc., Holtsville, N.Y.

[21] Appl. No.: 09/036,464

[22] Filed: Mar. 6, 1998

Related U.S. Application Data

[62] Division of application No. 08/541,238, Oct. 12, 1995, Pat. No. 5,762,512.

[51] Int. Cl.⁶ .................................................... H02J 7/00
[52] U.S. Cl. ............................ 320/114; 320/107; 439/347
[58] Field of Search ............................... 320/107, 112, 320/113, 114, 115; 439/347; 429/96, 97, 100

[56] References Cited

U.S. PATENT DOCUMENTS

| | | | |
|---|---|---|---|
| 2,701,332 | 2/1955 | Andre | 320/113 |
| 5,052,943 | 10/1991 | Davis | 439/357 |
| 5,327,067 | 7/1994 | Scholder | 320/107 |
| 5,525,888 | 6/1996 | Toya | 320/111 |
| 5,691,618 | 11/1997 | Kobayashi et al. | 320/115 |
| 5,762,512 | 6/1998 | Trant et al. | 439/347 |

FOREIGN PATENT DOCUMENTS

| 9520828 | 8/1995 | WIPO | 320/115 |
|---|---|---|---|

Primary Examiner—Peter S. Wong
Assistant Examiner—Gregory J. Toatley, Jr.
Attorney, Agent, or Firm—Kirschstein, et al.

[57] ABSTRACT

A battery-powered device, especially a hand-held, data collection terminal having an electro-optical scanner, includes a main housing, a battery pack separate from the main housing, and a latching mechanism for latching the battery pack in its assembled position on the main housing in which it is partially received in a correspondingly configured receiving recess of the main housing. Electrical circuitry in the device is shut down prior to battery pack removal. During idle periods, the device is supported on a cradle, with a back or handle portion of the device being received in a main compartment of the cradle. The cradle also includes an auxiliary compartment for receiving the battery pack for recharging the same. A hook-shaped projection of the cradle engages behind a detaining wall of the housing and is held in position by a shuttle that, in its locking position, is interposed between such projection and an unyieldable portion of the housing and is locked in place by a padlock passing through aligned openings of the shuttle and of the cradle.

10 Claims, 7 Drawing Sheets

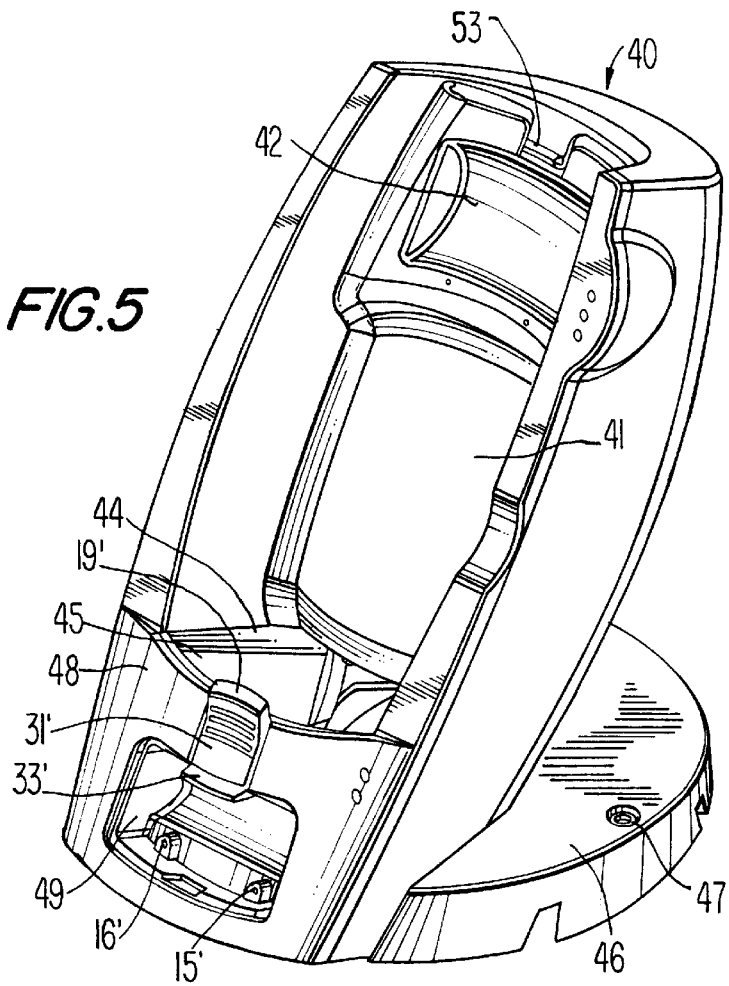
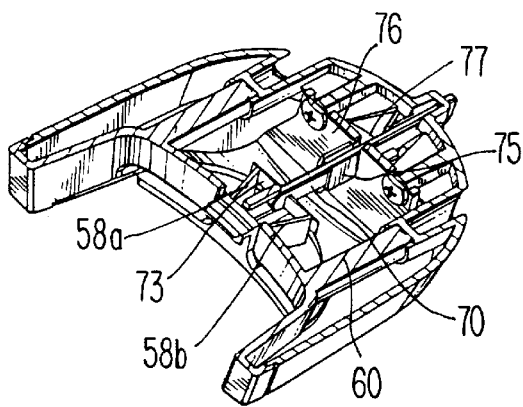
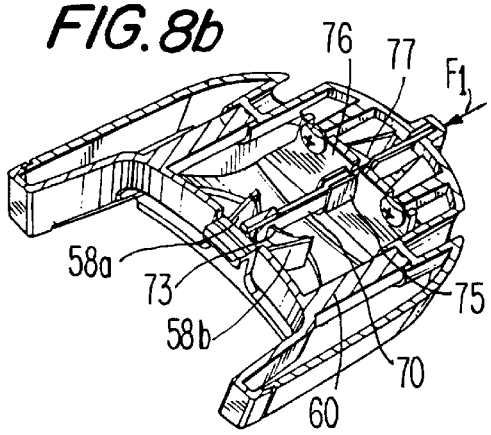

LOCKABLE STORAGE CRADLE FOR BATTERY-OPERATED ELECTRONIC DEVICE

This is a Division of application Ser. No. 08/541,238, filed Oct. 12, 1995, now U.S. Pat. No. 5,762,512.

BACKGROUND OF THE INVENTION

1. Field of the Invention

The present invention relates to battery-operated electronic devices in general, and more particularly to latchable battery packs and lockable storage cradles for use with such battery-operated electronic devices, and yet more particularly to controlling such devices to gracefully shut down prior to battery removal, and to gracefully turn on after battery installation.

2. Description of the Related Art

There are already known various constructions of electrical or electronic devices, among them such that are battery-powered during at least a part of their operation. In this context, it is already known to mount one or more batteries inside a main housing of the device behind an openable battery cover. However, experience has shown that the battery replacement process is rather arduous and prone to mishaps, including battery installation with improper orientation and, hence, polarity. Moreover, the tediousness of the process and/or the concealment of the batteries within the housing tend to make the user forget to, or even choose not to, remove the batteries from the device prior to an extended period of non-use of the device. Then, the batteries may leak acid into the housing, thereby damaging the components accommodated therein beyond repair.

To avoid these problems and others along a similar vein, it has been proposed relatively recently to accommodate the batteries, whether or not they are rechargeable, in a so-called battery pack, that is, in a cartridge separate from the main housing that accommodates the batteries proper and has external terminals positioned to establish electrical connection with correspondingly positioned contacts of the main housing of the device when the battery pack is in its installed position relative to the housing.

The known arrangements work reasonably well; however, experience has shown that many, if not all, of them suffer from a significant disadvantage, namely that the battery cover door may accidentally open, or the battery pack can become accidentally dissociated from the main housing of the device, be it as a result of the forces acting on the cover door or the battery pack during (possibly less than apt) handling of or maneuvering with the device, or because of inattentive deliberate action on the part of the user of the device. This, of course, is very disadvantageous not only because the batteries themselves, or the battery pack itself, may become damaged if either falls to the floor or other hard surface as a result of such accidental dissociation, but also because the circuitry contained in the device may suffer as a result of the attendant sudden loss of power thereto, either physically or figuratively by losing data temporarily stored or processed therein, or the like.

In addition, some other problems have been encountered when using previously proposed portable battery-operated electronic devices of the kind here under consideration. For one, the useful life of the battery pack, that is, the period of time during which it can power the device in a single session without depleting the amount of electric energy stored therein to a dangerous level, is limited, often to much less than the duration of the task to be performed. This means, of course, that either the entire device has to be put down somewhere while the battery pack is being recharged, either while still mounted on the device or after having been removed therefrom and installed in a battery-charging implement, or the exhausted battery pack has to be replaced by a fresh one.

Even in the latter case, though, there are instances when it is necessary or desirable to leave the device itself, whether or not it carries the battery pack at the moment, unattended at a location that is freely accessible to the general public, such as in a grocery, variety or department store or the like. To be able to do this without potentially losing the device and/or its battery pack to unsavory characters or to pranksters, it is desirable to be able to not only temporarily store the electronic device and/or its battery pack at the chosen location in a manner that would, effectively avoid accidental removal of the device, or of its battery pack, or both, from a cradle partially accommodating the same, with potential damage to the device or battery pack as a result of falling and hitting a hard surface, but also to prevent deliberate but unauthorized removal of the device and/or the battery pack from the cradle in a rather simple and yet reliable manner. This the known prior art fails to do.

OBJECTS OF THE INVENTION

Accordingly, it is a general object of the present invention to avoid the disadvantages of the prior art.

More particularly, it is an object of the present invention to provide an electrical device/battery pack assembly that does not possess the drawbacks of the known assemblies of this type.

Still another object of the present invention is to devise an assembly of the type here under consideration which includes a latching mechanism that assures reliable retention of the battery pack on the main housing of the assembly.

It is yet another object of the present invention to design the above latching mechanism in such a manner as to assure that its condition can be changed from latching to unlatching or vice versa only by deliberate action on the part of the user.

A concomitant object of the present invention is so to construct the latching mechanism of the above type as to be relatively simple in construction, inexpensive to manufacture, easy to use, and yet reliable in operation.

It is yet another object of the present invention to provide an assembly of the aforementioned device and battery pack combination with a cradle configured to partially accommodate each of the components of the combination, which cradle would assure secure retention of such components while the device is not being used as a portable device and/or while the battery pack is being recharged.

Still another object of the present invention is to design the aforementioned cradle in such a manner as to provide for locking of at least the device itself therein against unauthorized removal therefrom.

A further object of the present invention is to prevent data loss and to allow the aforementioned electronic device, especially when used as a data collection terminal, to gracefully shut down prior to the removal of the batteries or the battery pack therefrom for subsequent recharging.

Yet a further object of the present invention is to prevent power fluctuations and allow the aforementioned electronic device to gracefully turn on after installation of the batteries or the battery pack.

SUMMARY OF THE INVENTION

In keeping with the above objects and others which will become apparent hereafter, one feature of the present invention resides in a battery-powered, portable, electronic device that includes a main housing having a receiving recess; a battery pack separate from the main housing, including a portion received in the receiving recess of the main housing in an assembled position of the battery pack with respect to the main housing, and having a latching recess; and means for latching the battery pack in the assembled position.

According to the present invention, such latching means includes a support secured to the main housing at the receiving recess; a latching member mounted on the support for movement between an extended position in which the latching member extends into the latching recess of the battery pack then assuming its assembled position and thus latches the battery pack in place, and an unlatching position in which the latching member releases the battery pack for extraction of its aforementioned portion from the receiving recess of the main housing; and a locking member mounted on the support for movement between a locking position in which the locking member extends into the path of movement of the latching member toward the unlatching position, and a releasing position in which the locking member releases the latching member for such movement.

A main advantage of the present invention as described so far is that, because of the presence of, and the need for properly manipulating, at least one of the latching and locking members of the latching mechanism constituting the latching means, it is made virtually impossible for the battery pack to become separated from the main housing in the absence of deliberate action on the part of the user of the battery-powered device.

Advantageously, the support includes a pair of guiding portions for guiding the latching member while moving between its latching and unlatching positions. It is also advantageous when the support includes a pair of abutment portions, and the locking member includes a pair of corresponding engaging portions that engage the abutment portions of the support in the locking position of the locking member.

According to another aspect of the present invention, there is further provided a compression spring that urges the locking member towards the locking position thereof. Another advantageous feature of the present invention involves the provision of an extension spring, one of the end portions of which is connected to the support, and the other to the latching member, to urge the latching member toward its unlatching position.

An additional feature of the present invention can be found in the provision of the latching member with an engagement portion that overlaps the locking member in the releasing position of the latter as the latching member moves toward, or is in, its unlatching position to hold the locking member in its releasing position. In this context, it is especially advantageous when the locking member is provided with a ridge serving as an abutment for the engagement portion of the latching member in the unlatching position of the latter.

Moreover, in accordance with another facet of the present invention, means are provided for generating a control signal indicative of the impending removal of the battery power and the completion of installation of the same. According to the present invention, such signal generating means advantageously includes a switch having a casing stationary relative to the support, and an actuating element movable relative to the casing and operatively connected to the battery pack, or in the event that the batteries are directly mounted in the device, to the battery door cover. The actuating element extends into the path of movement of the locking member, or of the door, and is operative for initiating the generation of the control signal in dependence on its position relative to the casing. The configuration allows for sufficient time between signal generation and actual latch disengagement and, therefore, the control signal is used to gracefully shut down the operation of the device prior to the complete loss of battery power, and to gracefully turn on the device after battery installation.

The present invention is also directed to an electronic device assembly that includes said battery-powered, portable, electronic device which has a housing having a front portion and a back portion as considered from the vantage point of a user when the device is in use, and a cradle having a main compartment for receiving the back portion of the housing when the device is not being used as a portable device. In this context, it is advantageous, in a situation where there is provided a battery pack separate from the housing and removably mounted on the back portion of the latter at least while the device is being used as a portable device, when the cradle is further provided with an auxiliary compartment for receiving the battery pack when the device is not being used as a portable device. Then, to advantage, means may be provided in the auxiliary compartment of the cradle for recharging the battery pack when the latter is received in the auxiliary compartment. In this connection, it is particularly desirable when the assembly further includes at least one additional battery pack interchangeable with the one battery pack and used in alternation therewith on the device so as to enable the respective other of them to be recharged. The cradle may further have an additional compartment opening into the main compartment and configured to accommodate the battery pack mounted on the back portion of the housing while the latter is received in the main compartment.

Yet another facet of the present invention may be found in an electronic device assembly that includes, besides the aforementioned housing and cradle, means for holding the housing in position relative to the cradle when the back portion of the housing is received in the main compartment of the cradle. The cradle is equipped with a supporting surface serving as an abutment for one end portion of the housing when the back portion of the housing is received in the compartment in a rest position relative to the cradle. Then, the holding means includes, in accordance with one aspect of the present invention, a rim integral with the cradle and embracing at least a part of the one end portion of the housing when the housing is in its rest position relative to the cradle.

However, it is also desirable when the holding means includes, regardless of whether or not the cradle includes the aforementioned rim, a hook-shaped projection on the cradle that passes through an opening provided in the back portion of the housing at its end portion that is situated remotely from the supporting surface, and engages behind a detaining wall that adjoins this opening when the housing assumes its rest position on the cradle. This hook-shaped projection is elastically yieldable in a predetermined direction out of the path of movement of the detaining wall as the housing is being brought into and out of its rest position relative to the cradle.

It is especially advantageous when the cradle includes a depressable portion that is elastically yieldable relative to the remainder of the cradle and carries the hook-shaped projection for joint movement with it to enable the hook-shaped projection to clear the detaining wall when the depressable portion of the cradle is depressed.

The cradle further includes, in accordance with another aspect of the present invention, a substantially unyieldable portion arranged at a spacing from the hook-shaped projection as considered in the aforementioned predetermined direction. Then, there is further provided means for maintaining the hook-shaped projection in place, including a shuttle mounted on the cradle for movement into and out of a latching position in which a portion of the shuttle is interposed between the hook-shaped projection and the unyieldable portion of the cradle. To facilitate the handling of the shuttle, there is further provided means for urging the shuttle out of its latching position and toward its unlatching position. Such urging means includes a leaf spring mounted on the shuttle for joint movement with it and bracing itself against the cradle when displaced out of its unlatching position.

Last but not least, the electronic device assembly includes means for bounding respective openings in the shuttle and the cradle that are substantially aligned with one another in the latching position of the shuttle to enable passage of a lock, especially a portion of a padlock, therethrough.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a perspective view taken from the right side of a retention cradle for temporarily accommodating the electronic device of the type depicted in FIG. 1 while not being used as a hand-held device;

FIGS. 8a and 8b are sectional perspective views from below of a portion of the retention cradle, taken in the directions of the arrows 8—8 in FIG. 7;

DETAILED DESCRIPTION OF THE PREFERRED EMBODIMENTS

Figure 1:
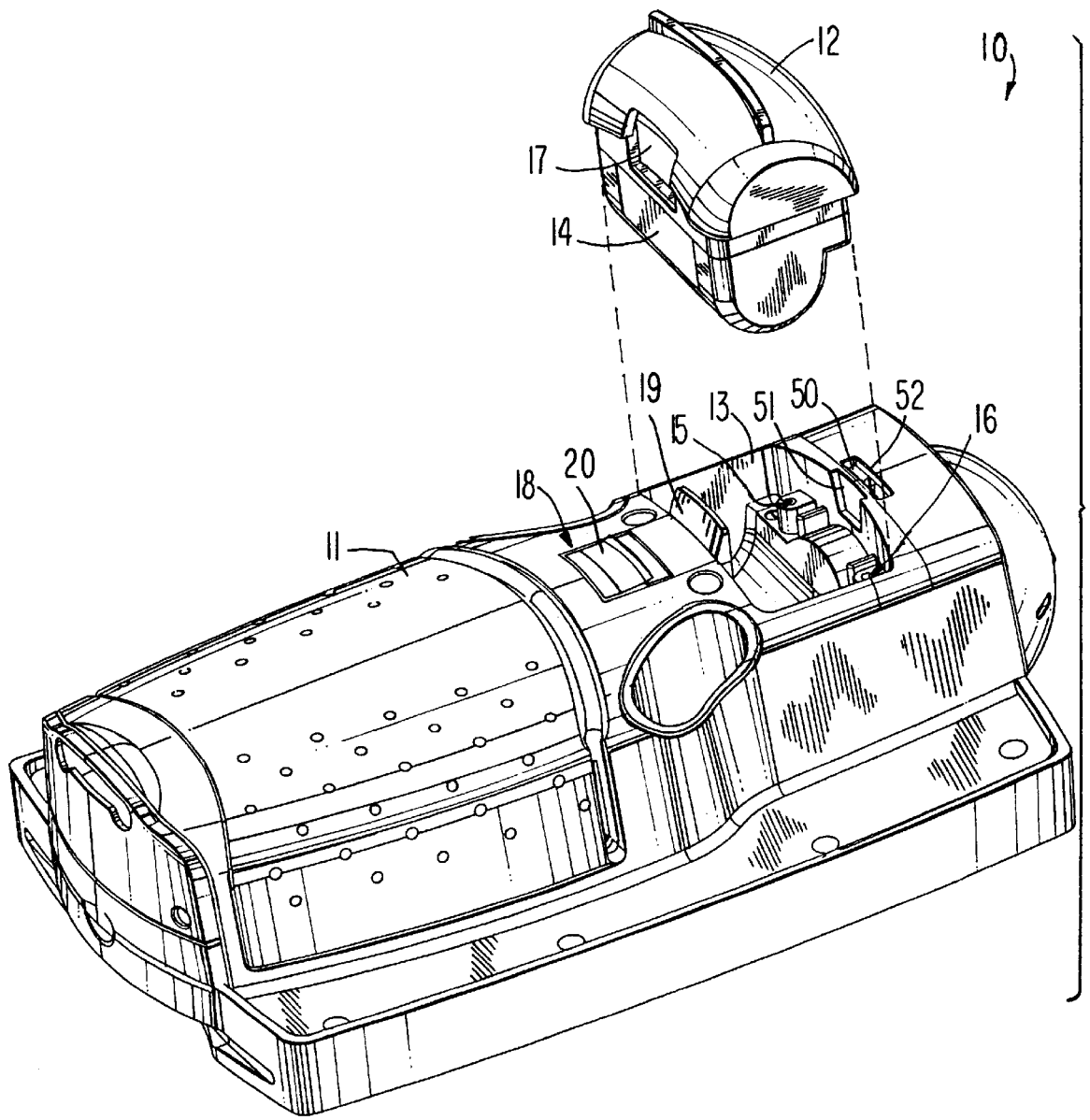
FIG. 1 is a partially exploded perspective view of an exemplary battery-powered device embodying the present invention, taken from the rear and from one side of the device.

Referring now to the drawing in detail, and first to FIG. 1 thereof, it may be seen that the reference numeral 10 has been used therein to identify a battery-powered, portable, electronic device which incorporates the present invention, in its entirety. The device 10 that is shown in the drawing, merely as an example of a device in which the present invention may be used to advantage, is constructed as, and has a configuration of, a hand-held data collection terminal having a built-in, electro-optical scanner of the type described in more detail in a copending and commonly owned U.S. patent application Ser. No. 08/489,729, filed Jun. 13, 1995, the disclosure of which is incorporated herein by reference to the extent required for better understanding of additional details of its structure and operation. However, it is to be mentioned at this very juncture that the present invention can be used in a plethora of other battery-powered devices, whether intended to be hand-held or not, so long as each of them includes a main housing of any desirable shape.

As is well known, the aforementioned main housing denoted in FIG. 1, here by the reference numeral 11, is environmentally sealed and carries a so-called battery pack of the type indicated at 12 when the device 10 is in use or ready to be used. The battery pack 12 is basically a separate cartridge, also environmentally sealed, and usually of a relatively rigid synthetic plastic material, which accommodates in its interior a battery proper (or a series of batteries) that may, but need not, be of the rechargeable type. What is important in the context of the present invention is that the battery pack 12 is to be mounted on the housing 11 for a relatively easy removal therefrom and assembly therewith, for instance for replacement of a nearly exhausted battery pack 12 by a fresh one, for placement of the battery pack 12 into a charging device (for example, see FIG. 5) for recharging therein, or the like. On the other hand, when the device 10 is in its assembled condition, that is when the battery pack 12 is properly mounted on the main housing 11, it must be assured that it will not accidentally become dissociated from the main housing 11, either on its own due to forces acting thereon while the device 10 is being manipulated, or as a result of inept handling of the device 10 by the personnel using the same.

With this objective in mind, the main housing 11 of the device 10 is provided with a receiving recess 13 that is dimensioned to receive, preferably in a substantially conforming fashion, a portion 14 of the battery pack 12. It will be appreciated that, once the portion 14 is thus received in the receiving recess 13, the battery pack 12 will not be able to move relative to the main housing 11 in any other manner than that indicated in broken lines in FIG. 1, that is, in an extraction direction. By the same token, the battery pack 12 will have to be moved in the opposite, or insertion, direction, in order to introduce its portion 14 into the receiving recess 13 of the main housing 11. It may further be seen in FIG. 1 that a pair of electrical contact arrangements 15 and 16 is provided within the receiving recess 13, substantially at a bottom region thereof. These contact arrangements 15 and 16 serve for establishing electrical connection with respective corresponding terminals that are provided on the portion 14 of the battery pack 12 and that have not been shown in order not to unduly encumber the drawing because the provision of such cooperating contact and terminal arrangements is well known from other devices of this kind.

FIG. 1 also reveals that the battery pack 12 is provided, at its region just above the portion 14, with a latching recess 17. The latching recess 17 serves to receive, preferably with only a minimum amount of leeway, a corresponding latching portion of a latching arrangement or mechanism 18 when the portion 14 of the battery pack 12 is properly seated within the receiving recess 13 of the main housing 11. It will become clear that this reception of the aforementioned latching portion of the latching mechanism 18 in the latching recess 17 of the battery pack 12 serves to retain the battery pack 12 in the receiving recess 13 of the main housing 11 against extraction in the aforementioned extraction direction.

Of course, in order for the latching mechanism 18 to properly and reliably perform this function, it must be assured that the aforementioned latching portion of the latching mechanism 18 is prevented from leaving the latching recess 17 of the battery pack 12 in any other manner than as a result of a deliberate action on the part of the user of the device 10 intent on removing the battery pack 12 from the main housing 11. The way in which this purpose is accomplished will be now explained with reference to the remainder of the drawing.

Figure 2:
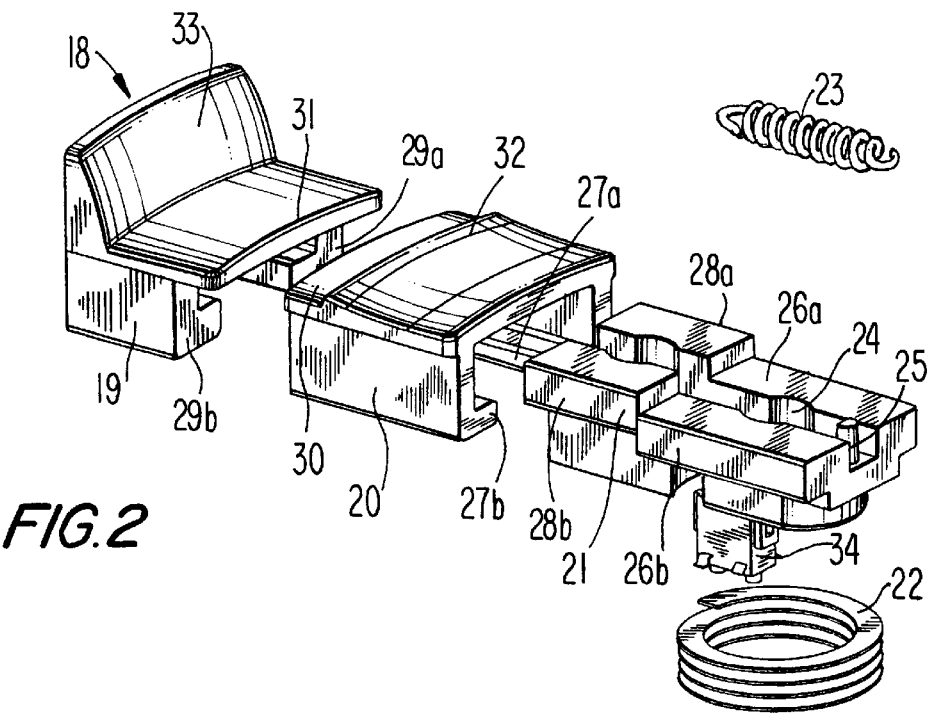
FIG. 2 is a perspective view, on an enlarged scale and in a disassembled condition, of a latching mechanism of the present invention to be used for latching a battery pack in place with respect to a housing, taken from the other side of the device depicted in FIG. 1.

As illustrated most clearly in FIG. 2 of the drawing, the latching mechanism 18 includes, as its main components, a latching member 19 proper, a locking button 20, and a support 21. The support 21 is mounted on the main housing 11 in any well known manner so as to stay in its position relative thereto, and the latching member 19 and the locking button 20 are supported on the support 21 for limited movement relative thereto in a manner yet to be described.

It is further to be mentioned, for the sake of completeness, that the latching mechanism 18 further includes an elastic compressed material, such as a coil-shaped compression spring 22 and an elastic tensioned material, such as a helical extension spring 23. It is also shown in FIG. 2 of the drawing that the support 21 is provided at its central region with a longitudinal channel 24 that serves to receive the helical extension spring 23 in the assembled condition of the latching mechanism 18, with one end of the spring 23 engaging a post 25 and/or behind another portion of the support 21 as illustrated especially in FIGS. 3a and 3b of the drawing.

It will be realized as the present description proceeds that the other end of the helical extension spring 23 engages the latching member 19 in a manner that is similar to that indicated above and hence is not illustrated. In any event, the helical extension spring 23 serves to pull the latching member 19 with respect to the support 21 in the longitudinal direction of the channel 24 and in an unlatching direction when the latching mechanism 18 is in its assembled condition. However, the locking button 20 prevents this motion in a manner also still to be described, unless deliberately moved out of the way.

To enable such limited movements, the support 21 is provided, on the one hand, with a pair of rail-shaped abutment portions 26a and 26b that serve to limit the extent of "upward" movement of the locking button 20, that is its movement away from the main housing 11, this and the opposite direction being the only directions in which the locking button 20 is allowed to move because of the constraints imposed thereon by the main housing 11 and/or the support 21. This limiting action is actually accomplished by the cooperation of the abutment portions 26a and 26b with corresponding projections 27a and 27b of the locking button 20, with these latter projections 27a and 27b engaging behind the abutment portions 26a and 26b in the "uppermost" position of the locking button 20. Of course, the coil-shaped compression spring 22, which braces itself, in a known manner that has not been illustrated, against a corresponding portion of the main housing 11 in the assembled and operative condition of the latching mechanism 18, pushes the locking button 20 toward this upper or locking position.

On the other hand, the support 21 is further provided with a pair of guiding portions or rails 28a and 28b that are substantially conformingly received in corresponding channels of the latching member 19 in that respective portions 29a and 29b of the latching member 19 engage behind them, thus limiting the movement of the latching member 19 in the assembled condition of the latching mechanism 18 relative to the support 21, and thus with respect to the main housing 11 and to the battery pack 12, to the longitudinal direction of the channel 24 provided in the support 21 and thus to the direction in which the helical extension spring 23 is effective to affect and effectively limit the extent of such longitudinal movement.

For the sake of completing the description of FIG. 2 of the drawing, it is to be mentioned that the locking button 20 and the latching member 19 are provided with respective cooperating engagement portions 30 and 31, that the locking button 20 has a raised ridge 32, and that the latching member 19 has an upstanding actuating portion 33. It is this actuating portion 33 that enters and is received in the latching recess 17 in the latching state. A switch 34 is provided, being mounted on the main housing 11 in any known manner so as to be able to cooperate with the locking button 20. Yet, these features and their operation and/or functions will be appreciated best from the remaining figures of the drawing and, hence, will be discussed in conjunction therewith.

Figure 3B:
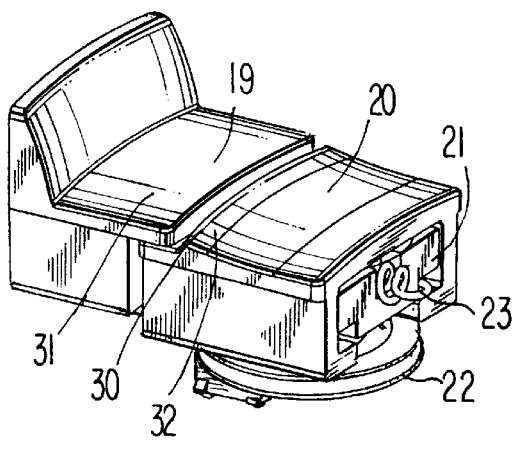
FIGS. 3a and 3b are views corresponding to that of FIG. 2, but with the latching mechanism in its assembled condition and in its latching and releasing state, respectively.
Figure 3A:
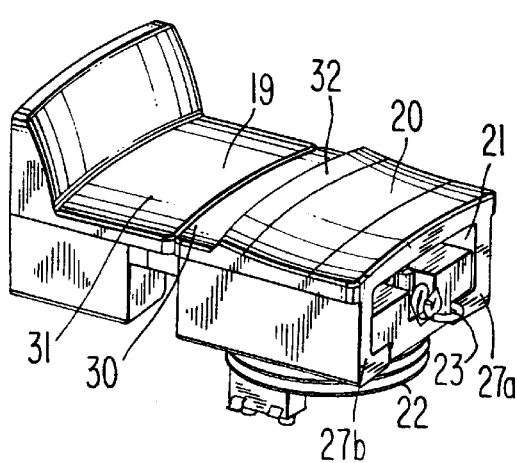

As may be seen in FIG. 3a of the drawing that shows the latching mechanism 18 in its latching state, the latching member 19 is in its latching or extended position, and the locking button 20 is in its upper or locking position. In this situation, the engagement portion 30 of the locking button 20 is in the path of movement of the engagement portion 31 of the latching member 19, thus preventing such engagement portion 31 and thus the entire latching member 19 from conducting movement in the retraction direction thereof in which it is urged by the action of the aforementioned extension spring 23. It is not until the locking button 20 is deliberately depressed by the user that the upstanding actuating portion 33 of the latching member 19 is freed to conduct such movement against the action of the extension spring 23 thereon toward its unlatching position that is illustrated in FIG. 3b of the drawing.

In the course of such longitudinal movement, the engagement portion 31 of the latching member 19 clears and rides on the corresponding engagement portion 30 of the locking button 20. The extent of such relative movement of the latching member 19 is limited, if need be, by the presence of the ridge 32 on the locking button 20, in that the engagement portion 31 of the latching member 19 may abut against the ridge 32 under such circumstances.

In any event, the engagement of the portions 30 and 31 with one another holds the locking button 20 in its depressed or "down" position, until the latching member 19 is deliberately moved into its latching position of FIG. 3a, using the actuating portion 33 of the latching member 19 for this purpose, if necessary. Thus, it may be seen that the effect of the locking button 20 is to safely maintain the latching member 19 in its extended position in which it latches the battery pack 12 in position relative to the main housing 11, unless and until released by depression of the locking button 20, an action that cannot occur spontaneously at all, and can hardly be expected to happen in an accidental manner.

Figure 4A:
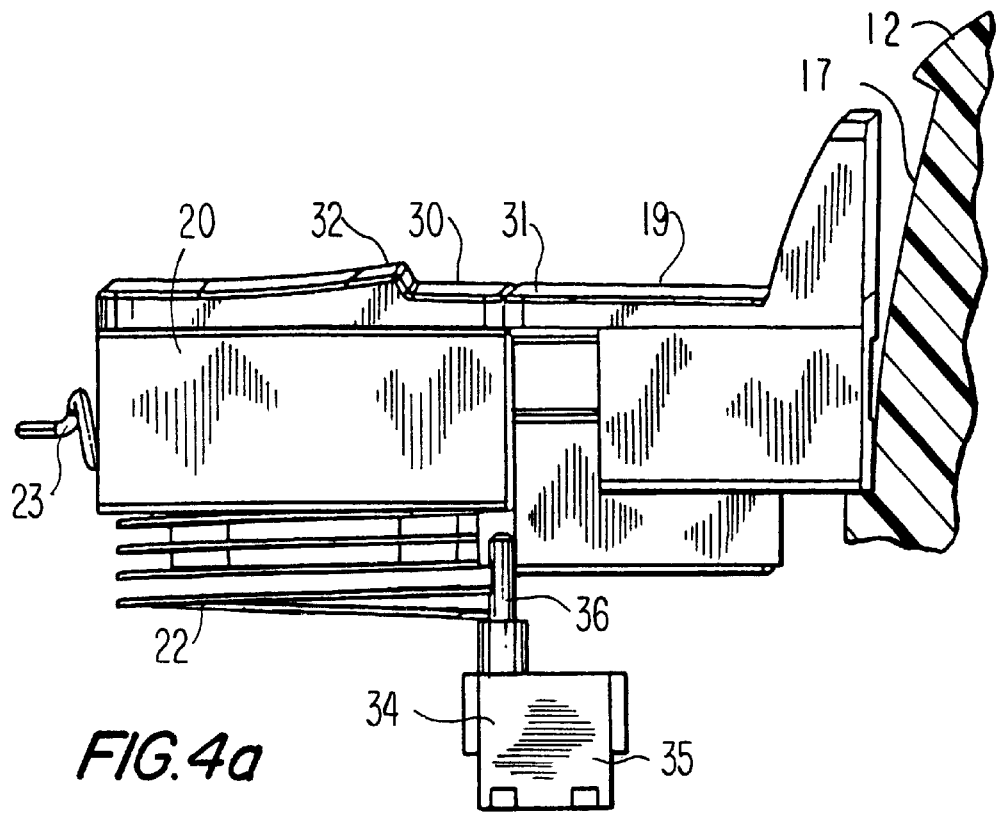
FIGS. 4a and 4b are still further enlarged side elevational views of the latching mechanism that correspond to those of FIGS. 3a and 3b, respectively, but taken from the same side as FIG. 1.
Figure 4B:
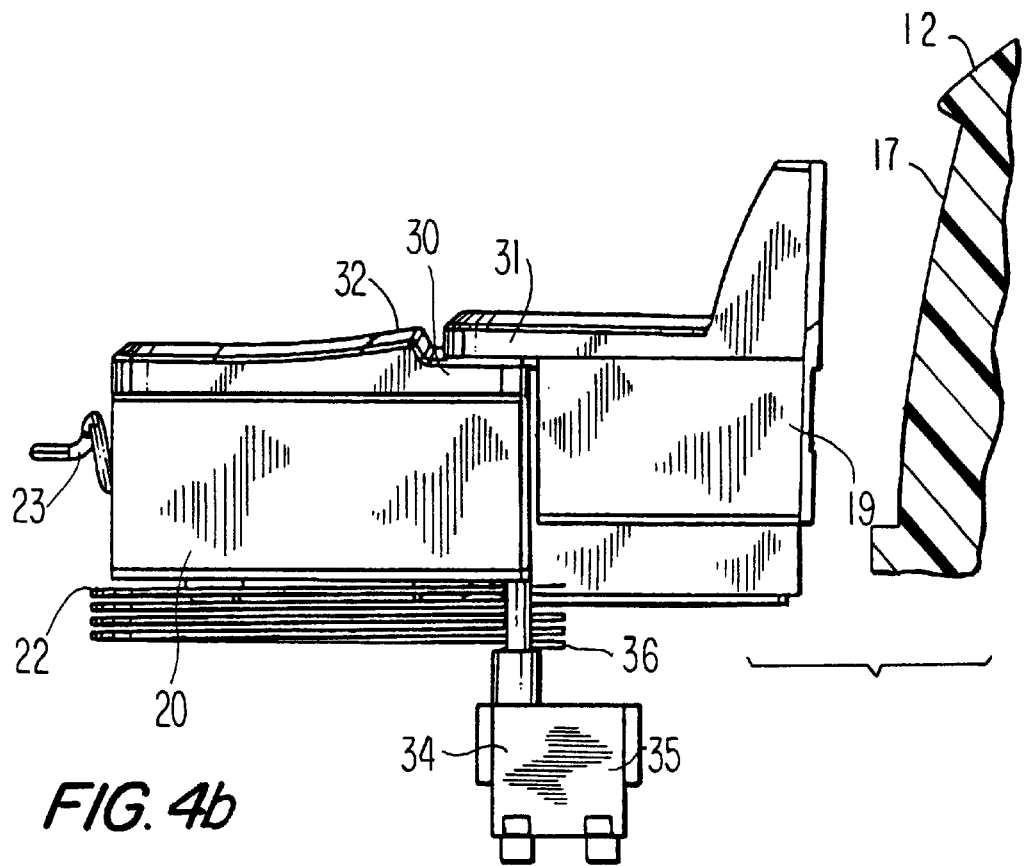

FIGS. 4a and 4b of the drawing, while also showing, with some additional degree of clarity, the cooperation of the latching member 19 and the locking button or member 20 with one another in the latching and unlatching conditions of the latching mechanism 18, also indicate the manner in which the latching mechanism cooperates with the aforementioned switch 34. However, it is to be mentioned first that the function of the switch 34 is to detect the impending removal of the battery pack 12 from the main housing 11 in time to allow the electronic or other circuitry or arrangement contained in or on the device 10 to shut down "gracefully", that is, in a manner that will not result in any loss of information and/or otherwise interfere with the proper operation of the device 10 once powered up again.

To this end, the switch 34 includes, besides a casing 35 that is, as mentioned before, mounted on the main housing 11 in such a manner as to be stationary relative thereto, an actuation element 36 that is movable with respect to the casing 35 and that serves to close the switch proper in its extended position shown in FIG. 4a and open it in its depressed position of FIG. 4b. The actuation element 36 bypasses the compression spring 22 at some distance therefrom, but extends into the path of movement of the locking button 20 from its locking position of FIG. 4a toward its releasing position of FIG. 4b. Inasmuch as the depression of the locking button 20 is what gets the whole unlatching process started, that is, it must be completed before the latching member 19 can even commence its movement from its latching to its unlatching position, the depression of the actuation element 36 and the consequent opening of the switch proper, which take place during the course of downward movement of the locking button 20, of necessity precede the removal of the battery pack 12 by a certain amount of time which, while it may vary depending on the dexterity of the user and/or the speed with which he or she accomplishes the battery pack removal, is always sufficient to allow the aforementioned graceful shut down of the electronic circuitry and other equipment of the device 10. The force of the compression spring at disengagement is designed to be greater than the shock force that would be experienced even for a drop at a substantial height, thereby preventing accidental unlatching.

Once the switch 34 is thus actuated, it remains actuated until another willful action takes place, namely not only the cessation of the application of pressure on the locking button 20 but also the subsequent movement of the latching member 19 by a deliberate action on the part of the user into its latching position. This can only happen because of deliberate action on the part of the user because the engagement portion 31 of the latching member 19 overlaps the corresponding engagement portion 30 of the locking member 20 holding the latter down, and continues to do so until the latching member 19 is displaced fully into its latching position. Since such displacement is resisted by the action of the extension spring 23, it is unlikely to happen in the absence of deliberate action of the user. This means that the control signal for beginning to power up the electronic and other electrical circuitry or components cannot be generated until some time after the battery pack 12 has been installed and the electrical connection of its battery terminals with the contacts 15 and 16 has been safely established, thus avoiding any problems that could result from voltage spikes or fluctuations that may occur during the establishment of such electrical connections.

Of course, the switch 34 could be used to actually interrupt the supply of electric power to the various electrical or electronic components of the device 10 and to re-establish it later. However, it is currently preferred, as mentioned above, to merely use the switch for generating an impending shutoff signal and a battery installation completion turn on signal that are then used by the electronic circuitry proper to actually shut off the components in question or power them up, as the case may be, either all at once or in a predetermined sequence. In this case, it is immaterial if the switch is closed in its position of FIG. 4a and open in its position of FIG. 4b inasmuch as it is the change in the level of the signal, rather than the value of such signal, that matters under these circumstances. Of course, the aforementioned electronic circuitry that evaluates such shutoff or turn on signal must "know" the significance of such change, i.e. it must be informed, by software or otherwise, that a first signal level (whether it be high or low) means that the locking button 20 is in or approaches its locking position while the other level signifies that the locking button 20 is approaching or is already in its releasing position.

FIG. 5 of the drawing, in which the elements or parts performing the same or similar functions as their previously described counterparts are designated with the same reference numerals as before but each supplemented with a single prime, depicts a retention cradle 40 that is constructed to safely and securely hold or accommodate the electronic device 10 illustrated in FIG. 1 of the drawing while such device 10 is not being used as a hand-held device, that is, while it is either not being used at all, or while it is being used as a stationary device. To this end, the retention cradle 40 is provided with a receiving compartment 41 shaped to receive the handle portion or back side (that is, the side facing in the upward direction in FIG. 1) of the housing 11 of the device 10, advantageously in a substantially conforming fashion.

Yet, it may be observed in FIG. 5 of the drawing that the receiving compartment 41 additionally includes a depression 42 shaped to receive the battery pack 12 so long as the latter is properly mounted on the main housing 11. The retention cradle 40 further includes at least one supporting surface 44 at its bottom region, for the corresponding bottom region of the main housing 11 to rest upon when the device 10 is put down into the cradle.

At this juncture, it is to be mentioned that, while the retention cradle 40 is shown in its position in which it is likely to be mounted in most if not all instances and, consequently, all references made herein with respect to directions (up, down, left, right, etc.), orientation (upright, etc.) and/or relative positions (top, bottom, etc.) refer to the situation depicted in the various FIGS. of the drawing, this particular upright type of mounting of the cradle 40 is not mandatory. As a matter of fact, as will become apparent later, the cradle 40 could be mounted in a horizontal front-to-back or sideways orientation or even in an orientation inverted with respect to that shown in FIG. 5, with the compartment 41 opening upwardly, frontwardly, or to one side or the other, depending on the exigencies of the moment and/or the particular circumstances encountered at the location at which the cradle 40 is to be mounted, such as space availability and access, and/or the preferences or convenience of the user.

In some of these instances, the supporting surface 44, which is shown to be provided on a ledge 45 (actually, a pair of them, with the other one being obscured, however) will not actually support the main housing 11 of the device 10 but rather serve merely as an abutment for delimiting the extent of insertion on the housing 11 into the compartment 41 as the device 10 is being deposited onto or into the cradle 40.

The cradle 40 is shown to include a base 46 by means of which it is mounted on a non-illustrated support. The base 46 may be made and usually is large enough to prevent toppling over of the cradle 40 while empty and, coupled with a rearwardly reclining orientation of the cradle 40, even when the latter supports the device 10, and even when the base 46 merely rests on a horizontal (or only slightly inclined) support surface. However, for a variety of reasons not the least of which is assuring that the cradle 10 will assuredly retain its position and orientation no matter to what external forces it is subjected, it is currently proposed to secure the base 46 to the respective support. To this end, the base 46 is provided with a plurality of openings 47 (just one shown) through which screws, bolts or other fastening elements can be passed to connect the base 46 and thus the entire cradle 40 to the support.

Advantageously, the cradle 40 is also provided at its bottom region with a ridge or rim 48 that rises above the level of the supporting surface 44. The presence of the rim 48 prevents introduction of the housing 11 into the compartment 41 by a simple front-to-back movement; rather, the housing 11 has to be introduced into the compartment 41 at a slightly higher elevation than that or the top of the rim 48 to clear the latter, and then let or caused to drop or descend until it abuts against the supporting surface 44. By the same token, however, the rim 48 prevents the bottom portion of the housing 11 from accidentally slipping out of the compartment 41 of the cradle 40, as desired in accordance with the present invention.

FIG. 5 of the drawing also shows that the cradle 40 further includes an auxiliary compartment 49 that is shaped to partially receive the battery pack 12 of the device 10 (or a supplemental one just like it). Contact arrangements 15' and 16' not unlike, or identical to, those indicated in FIG. 1 of the drawing at 15 and 16, are arranged at appropriate locations within the auxiliary compartment 49 to cooperate with the aforementioned terminals of the respective battery pack 12. However, unlike the contact arrangements 15 and 16, the contact arrangements 15' and 16' are electrically connected not with the device 10 but with a source of electric power, such as a battery charging device or circuitry at least a part of which may be accommodated within the cradle 40.

A slider or latching member 31' is mounted on the cradle 40 (actually, at least partly on the rim 48 thereof) for sliding in the up or down direction. When the slider 31' is in its uppermost position, it offers unrestricted access for the auxiliary compartment 49 for unimpeded introduction of the respective battery pack 12 into, or its removal from, the auxiliary compartment 49. On the other hand, when the slider 31' assumes its lowermost position, its portion 33' extends into the latching recess 17 (see FIG. 1) of the respective battery pack 12, provided that the latter is properly received in the auxiliary compartment 49, and hence latches the battery pack 12 in its position in which its terminals are in electrical contact with the contact arrangements 15' and 16'. To facilitate the performance of the movements of the slider 31' between its end positions, its engagement portion 31' may be corrugated, as shown. For reasons that will become apparent later on, the slider 31' is advantageously positioned on the cradle 40 in such a manner as to be made either inaccessible and/or substantially immovable by the device 10 when the latter is supported on the cradle 40 in its proper rest position, that is, with the back or handgrip portion of the housing 11 being substantially conformingly received in the main compartment 41 of the cradle 40.

It ought to be reiterated here that the above-discussed recharging feature of the present invention can be used for recharging the battery or batteries of the very battery pack 12 that has been used to power the device 10 immediately prior to the commencement of the recharging operation, such as during extended periods of inactivity of the device (such as overnight), in that the battery pack 12 is dissociated from the main housing 11 in the manner described before and introduced into and latched in the auxiliary compartment 49 in the just-described manner. However, it is also contemplated by the present invention to use this recharging feature (and the recharging or auxiliary compartment 49 in which it is performed) for charging the supplemental battery pack mentioned before while the original one shown at 12 in FIG. 1 is being used to power the device 10, and to subsequently use such freshly charged supplemental battery pack as a substitute for the exhausted or substantially depleted original battery pack 12, repeating this switching process later by substituting the recharged original battery pack 12 for the exhausted substitute one, and so on ad infinitum or until one or both of them becomes damaged or otherwise unusable. In the preferred embodiment, the supplemental battery pack mounted in the auxiliary compartment 49 is recharged at the same time as the original one, while mounted on the device and received in the depression 42.

It was mentioned before that the rim 48 retains the bottom portion of the housing 11 of the device in the retention compartment 41. This may be sufficient under some circumstances. However, in accordance with the present invention, it is further proposed to hold the affected portion of the housing 11 of the device 10 in the compartment 41 at its upper region as well. To this end, the housing 11 is provided, as shown in FIG. 1 of the drawing, with an opening 50 that is separated from the recess 13 by a partitioning wall 51 and, on the other side, is adjoined by a web-shaped detaining wall 52. Moreover, the cradle 40 is provided, at a location that is appropriate for this purpose, with a hook-shaped projection or nose 53 that is configured and positioned in such a manner, and has, and/or the surrounding areas of the cradle 40 have, such inherent properties, as to resiliently yield out of the path of movement of the detaining wall 52 as the upper portion of the housing 11 is moved backwards in the retention compartment 41 of the cradle 40 while the bottom of the housing 11 is in contact with the supporting surface 44. This out-of-the-way yielding continues until the hook-shaped nose 53 fully enters the opening 50 and engages behind the detaining wall 52.

This engagement of the nose 53 with the detaining wall 52 is often all that is needed to safely retain the upper portion of the housing 11 in the compartment 41. On the other hand, all that is needed to remove the device 10 from the cradle 40 in this scenario is to cause the nose 53 to yield out of the path of movement of the detaining wall 52, either by deliberately depressing it or the surrounding areas of the cradle 40, or by applying to the device a force sufficient for the nose 52 to the deformed in such a manner as to enter the opening 50. No matter which of these approaches is chosen, a relatively slight subsequent tilting of the device 10 about its bottom portion results in the removal of the nose 53 from the opening 50 and subsequent relatively slight upward movement of the device 10 takes the bottom portion of the latter out of the confinement of the rim 48, thus freeing the device 10 for transfer to any destination remote from the cradle 40.

This relatively unimpeded removal of the device 10 from the cradle 40, however, may not be desirable under some circumstances, especially when there is the danger that some unauthorized person could gain access to the cradle 40 and remove the usually quite expensive device 10 therefrom and thereafter from the premises altogether, to sell it for personal gain. To avoid this possibility, or at least to make it so difficult as to dissuade such a person from even attempting such removal for fear of apprehension, it is further proposed in accordance with the present invention to provide a locking mechanism for locking the nose 53 in its locking position in which it engages behind the partitioning wall 52.

Figure 6:
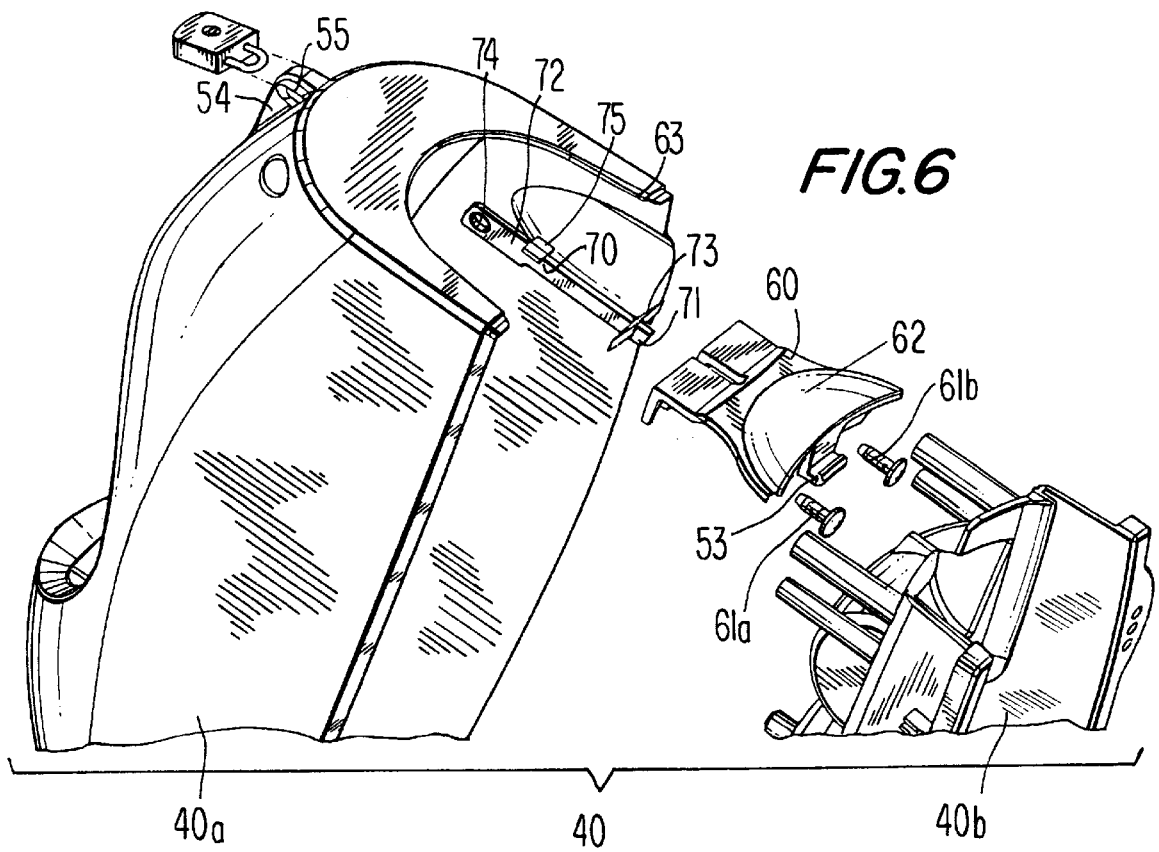
FIG. 6 is a perspective exploded view taken from the left side of an upper portion of the retention cradle as considered in the position shown in FIG. 5 and revealing an additional feature of the present invention.

As illustrated especially in FIG. 6 of the drawing, in the currently preferred embodiment of this aspect of the present invention, the cradle 40 includes a back part 40a and a front part 40b that are rigidly connected with one another in any well-known manner in an assembled condition of the cradle 40, as well as a nose-carrying member 60 that is equipped with the aforementioned nose 53 and is connected to the back part 40a of the cradle 40 in a cantilevered fashion by two screws 61a and 61b in the illustrated embodiment. The nose-carrying member 60 includes a raised portion 62 that is shown to actually carry the nose 53, and is substantially fittingly received in a cutout 63 that is provided in the back part 40a of the cradle 40, but with freedom of movement into the compartment 41 and back to the extent permitted by the resiliency and/or the cantilevered mounting of the nose-carrying member 60. This in-and-out movement facilitates the introduction of the nose 53 into the opening 50 and its engagement behind the detaining wall 52, as well as, and especially, the reverse of this process, i.e. the disengagement of the nose 53 from the detaining wall 52 and its withdrawal from the opening 50. As a matter of fact, at least the withdrawal process would be impossible to accomplish without damaging the cradle 40 and/or the device 10 beyond repair in the absence of such yielding movement.

It is, however, precisely this property of the nose 53 that is being used in accordance with the present invention to avoid the aforementioned unauthorized removal of the device 10 from the cradle 40. More particularly, since a potential thief of the device 10 would ordinarily shy away from inflicting such serious damage, being afraid, quite justifiably so, that it would be accompanied by the generation of a substantial amount of noise that could alert nearby retail establishment personnel. As a matter of fact, it is also extremely likely that such a person will abstain from any activity in getting possession of the device 10 that would consume a substantial amount of time, whether or not such activity would result in the generation of noise. Because of this, it is quite sufficient to resort to a relatively simple yet quite ingenious method with the aim of preventing unauthorized removal of the device 10 from the cradle 40 with a very high degree of success.

According to the present invention, this method involves the use of a shuttle 70 that is supported in the cradle 40 in a manner yet to be described for movement between its locking and releasing positions. As shown especially in FIG. 6 of the drawing, the shuttle 70 is elongated and substantially strip-shaped, having respective first and second ends 71 and 72. The first end 71 carries a leaf spring 73 that is so mounted on the shuttle 70 as to extend substantially transversely thereto and normal to its major surfaces, presenting a different portion or wing on each side of the shuttle 70. On the other hand, the other or second end portion 72 is provided with a through aperture 74. In addition, a deformable motion-limiting formation 75 is provided on the shuttle 70 intermediate its ends 71 and 72. FIG. 6 also shows that the cradle 40 is provided at its backside with a protuberance 54 that is provided with a through hole 55.

Figure 7:
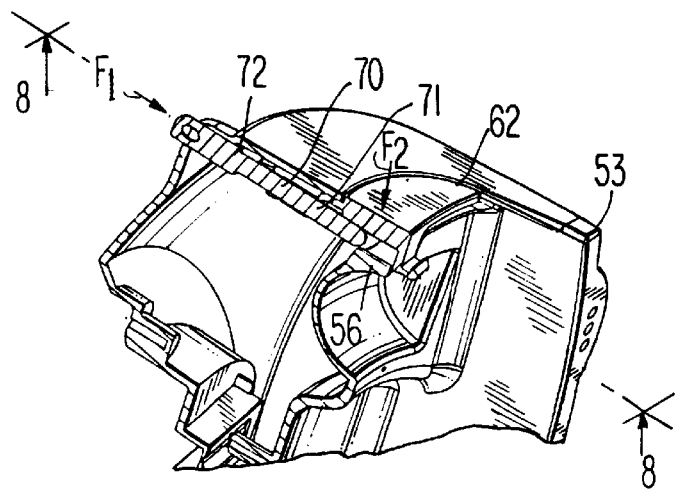
FIG. 7 is partially sectioned view corresponding to FIG. 6 but showing the retention cradle in its assembled condition.

As shown in some detail particularly in FIG. 7 of the drawing, the first end 71 of the shuttle 70 is interposed between the raised portion or button 62 and a substantially rigid and unyieldable internal portion 56 of the cradle 40, after the shuttle 70 has been pushed fully into its locking position by a force indicated at $F_1$. Because of this interposition and the high resistance of the internal portion 56 to deformation or displacement, when the shuttle 70 is pushed fully in, the raised portion 62 cannot yield either when pressed upon by a force $F_2$ even if such force has a rather substantial magnitude. This means that the nose 53 which, as mentioned before, is mounted on the raised portion or actuating button 62 for joint movement therewith, cannot be moved out of the path of movement of the aforementioned partitioning wall 52 when it is attempted to move the upper portion of the housing 11 out of the cradle 40 or out of its compartment 41 without moving the shuttle 70 back into its original or releasing position.

Now, as mentioned before, the main if not only purpose of the shuttle 70 is to prevent unauthorized removal of the device 10 from the cradle 40. This very purpose would be defeated if anyone were able to move the shuttle 70 from its locking to its releasing position at will or, worse yet, if the shuttle 70 tended to return to its releasing position by itself, as is indeed the case in the illustrated embodiment of the present invention. And this is where the hole 55 in the protuberance 54 and the aperture 74 in the second end portion 72 of the shuttle 70 come in. More particularly, in the locking position of the shuttle 70, the aperture 74 is at least substantially aligned with the hole 55, so that the U-shaped member of a small padlock can be passed through them. Of course, the freedom of movement of the shuttle 70 is terminated once the U-shaped member of the padlock (or, for that matter, any other fitting object, such as a pencil or a pen), is passed through such aligned openings 74 and 55; however, the locking of the padlock assures that no person not having the key to the padlock or not privy to the numerical combination that opens the padlock, as the case may be, will be able to remove the interfering object (the U-shaped member of the padlock) from the aligned openings 74 and 55 and hence move the shuttle 70, or cause it to move, to its releasing position.

Moreover, inasmuch as it is impossible in the currently preferred embodiment of the present invention to move the slider 31' (shown in FIG. 5 of the drawing only) out of its latching position while the device 10 is supported in its rest position on the cradle 40, in that the housing 11 of the device 10 either bars access to the slider 31', or stands in the way of movement thereof into its unlatching or releasing position under these circumstances, the locking of the device 10 in position on the cradle 40 also, in effect, locks the dissociated battery pack 12 in the auxiliary compartment 49 of the cradle 40, thus preventing its theft as well so long as the above conditions prevail.

Of course, if two of the battery packs 12 are used alternatively, with one being recharged while the other is being used and hence its electric energy drained, other precautionary measures must be taken to prevent the unauthorized removal of the battery pack 12 being recharged from the auxiliary compartment 49, provided that the battery pack 12 by itself, without the device 10, would still be of some value to the potential thief. This may involve, for instance, separately padlocking the slider 31' in its latching position as well.

Further details of the construction of the shuttle 70 and of the cooperating parts of the cradle 40, and especially of the nose-carrying member 60 thereof, are revealed in FIGS. 8a and 8b of the drawing. It may be observed there that in the releasing position of FIG. 8a the leaf spring 73 is substantially straight, i.e. relaxed, being situated next to a pair of detaining portions 58a and 58b provided stationarily within the cradle 40. On the other hand, as the shuttle 70 is moved, in response to the application of the force $F_1$ to its second end 72, toward its locking position illustrated in FIG. 8b, the two wings of the leaf spring 73 first come into contact with the detaining portions 58a and 58b, respectively, if they were not in such contact to begin with, whereupon any further displacement of the shuttle 70 in the locking direction results in resilient or elastic deformation of the leaf spring 73. This, of course, is accompanied by energy storage in the spring 73, causing the latter to urge the shuttle 70 toward its releasing position and actually displace it into this position once the application of the force $F_1$ (or its substitute, such as that applied by the bracing action of the padlock) is terminated.

It may also be seen in FIGS. 8a and 8b that the motion-limiting formation 75 is deformed relative to its shape shown in FIG. 6. The reason for this deformation, which may be attended to only after the shuttle 70 has been introduced into a corresponding channel of the cradle 40 and/or into its nose-carrying member 60 in its original condition, is to assure that the shuttle 70 cannot be withdrawn from or fall out of such channel once properly installed therein, in that this motion-limiting formation 75 in its thus deformed condition is unable to clear certain obstructions placed in its way that it had bypassed or would be able to bypass in its undeformed condition. More particularly, there is provided a partitioning wall 76 in the interior of the cradle 40 which has an open slot wide enough for the shuttle 70 itself to freely pass therethrough, but sufficiently narrow not to let the formation 75 to pass though it when it is in its deformed state.

The aforementioned device 10 is, in accordance with said co-pending application, preferably a data collection terminal having an on-board electro-optical scanner operative for reading coded indicia such as bar code symbols. Such a scanner, as is well known in the scanning art, includes a light source, preferably a laser diode, for emitting a laser beam through an exit port or window to a symbol for reflection therefrom. Optical elements in the path of the laser beam are used to focus the laser beam to an optical spot having a generally circular or oval cross-section throughout a working distance exteriorly of the device. Light reflected from the symbol enters the window and is detected by a photodetector, preferably a photodiode, over a field of view.

The laser beam and/or the field of view is swept by a movable scanning element, typically a scan mirror in the path of the laser beam and/or the field of view. The detector generates an analog electrical signal of variable intensity indicative of portions of the symbol that have different light reflective characteristics. The variable analog signal is converted into digital signals by a digitizer circuit. The widths of the digital signals corresponds to the widths of the symbol portions, i.e., the bars and spaces thereof. These digital signals are then decoded by a separate decoder or preferably by a microprocessor in accordance with an algorithm into data descriptive of the symbol being read. This data is stored in an on-board memory for subsequent downloading to a remote host computer for processing.

A keyboard or analogous manual entry system is provided on the terminal to enable manual data entry. A display is also provided for displaying the data or other related information. A trigger is often used to enable a user to initiate the reading operation.

In FIG. 1, the light source, optical elements, the photo-detector and the scanning element, conventionally collectively termed a "scan engine", are mounted in a dome-shaped superstructure at the upper end of the main hosing. The display and keyboard are not visible in FIG. 1, and are situated at the front of the main housing. The trigger (and, in this case, two triggers) is situated at the back of the housing. The microprocessor, the memory and other circuitry are mounted within the main housing.

Figure 9:
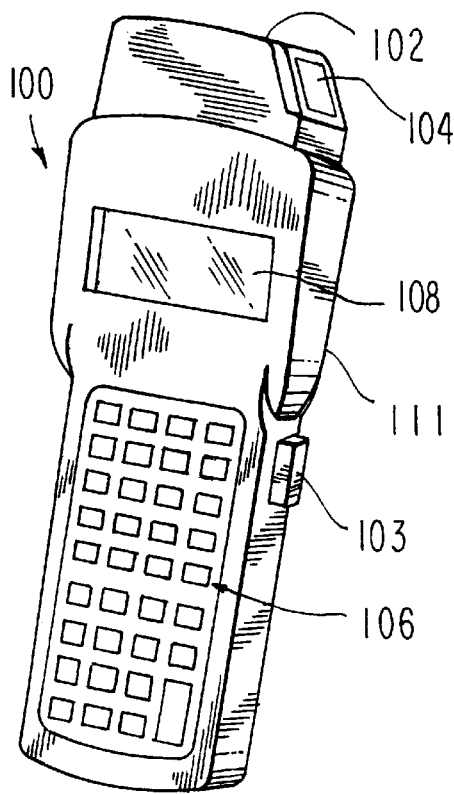
FIG. 9 is a front perspective view of a hand-held data collection terminal embodying the present invention, in accordance with another embodiment of a main housing thereof.
Figure 10:
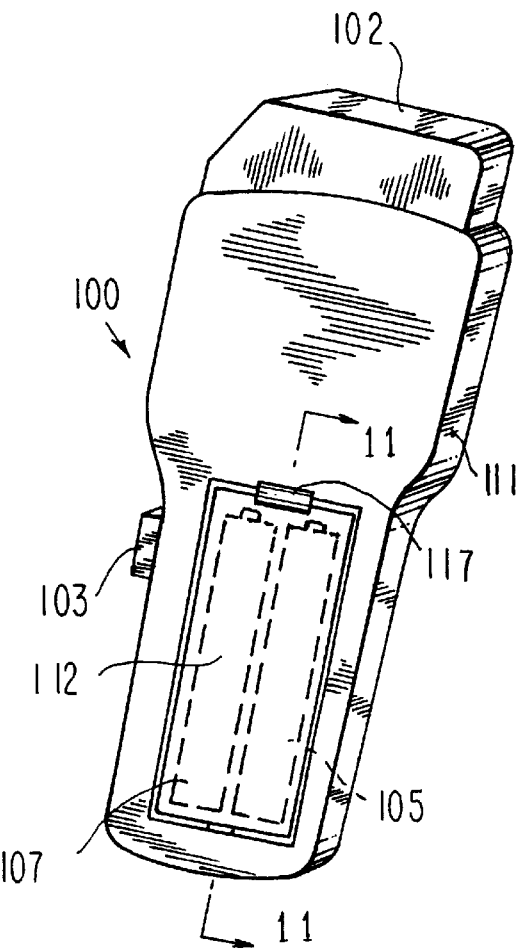
FIG. 10 is a rear perspective view of the terminal of FIG. 9.

Turning now to FIGS. 9 and 10, the front and rear views of a differently configured data collection terminal or device 100 are illustrated. The device 100 includes a main housing 111, and a superstructure 102 in which the scan engine is mounted. A window 104 permits exit of the outgoing light beam and the return of the light reflected from the bar code symbol to be read. The superstructure 102 can be swiveled so that the window 104 faces in the illustrated direction (toward the right) or in the opposite direction (toward the left). A keyboard 106 and a display 108 are provided on the front of the housing. A trigger 103 is provided at the side of the housing.

Figure 11:
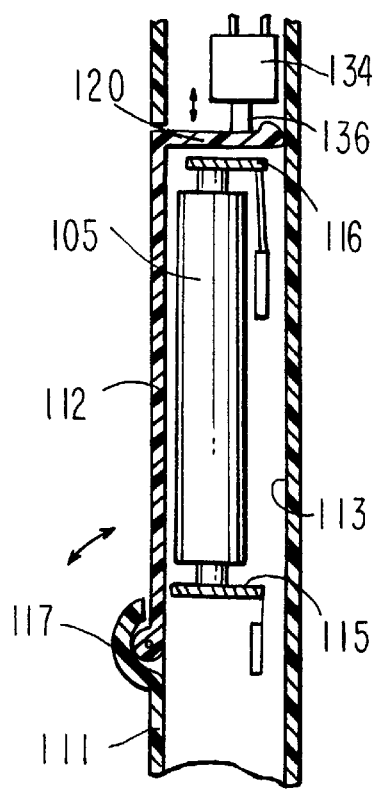
FIG. 11 is a broken-away sectional view taken on line 11—11 of the terminal of FIG. 10.

As shown especially in FIGS. 10 and 11, a set of batteries 105, 107 is mounted in a receiving recess 113. These batteries supply the electrical power to enable all the electrical components within the device 100 to operate. A set of electrical contact arrangements 115, 116 within the recess 113 is used to conduct the battery power to the electrical components.

A door 112 hinged at hinge 117 to the housing 111 is movable between a closed position (as illustrated) in which access to the recess 113 is blocked, and an open position (not illustrated) in which the batteries can be replaced. Door 112 has a depending post 120 which cooperates, as described below, with an actuating portion 136 of an electrical switch 134 stationarily mounted with the housing 111. In the closed position, the post 120 depresses the actuating portion 136 and actually moves the latter toward the right in FIG. 11, thereby generating a control signal. In the open position, the post 120 releases the actuating portion and allows the latter to return to its original extended position in the path of movement of the post 120. This control signal is used to signal the device of the impending removal of the batteries and, as a result, to gracefully shut down the electrical components as described above, and is further used to signal the device of the re-installation of the batteries, again to gracefully power up the electrical components as described above.

Figure 12:
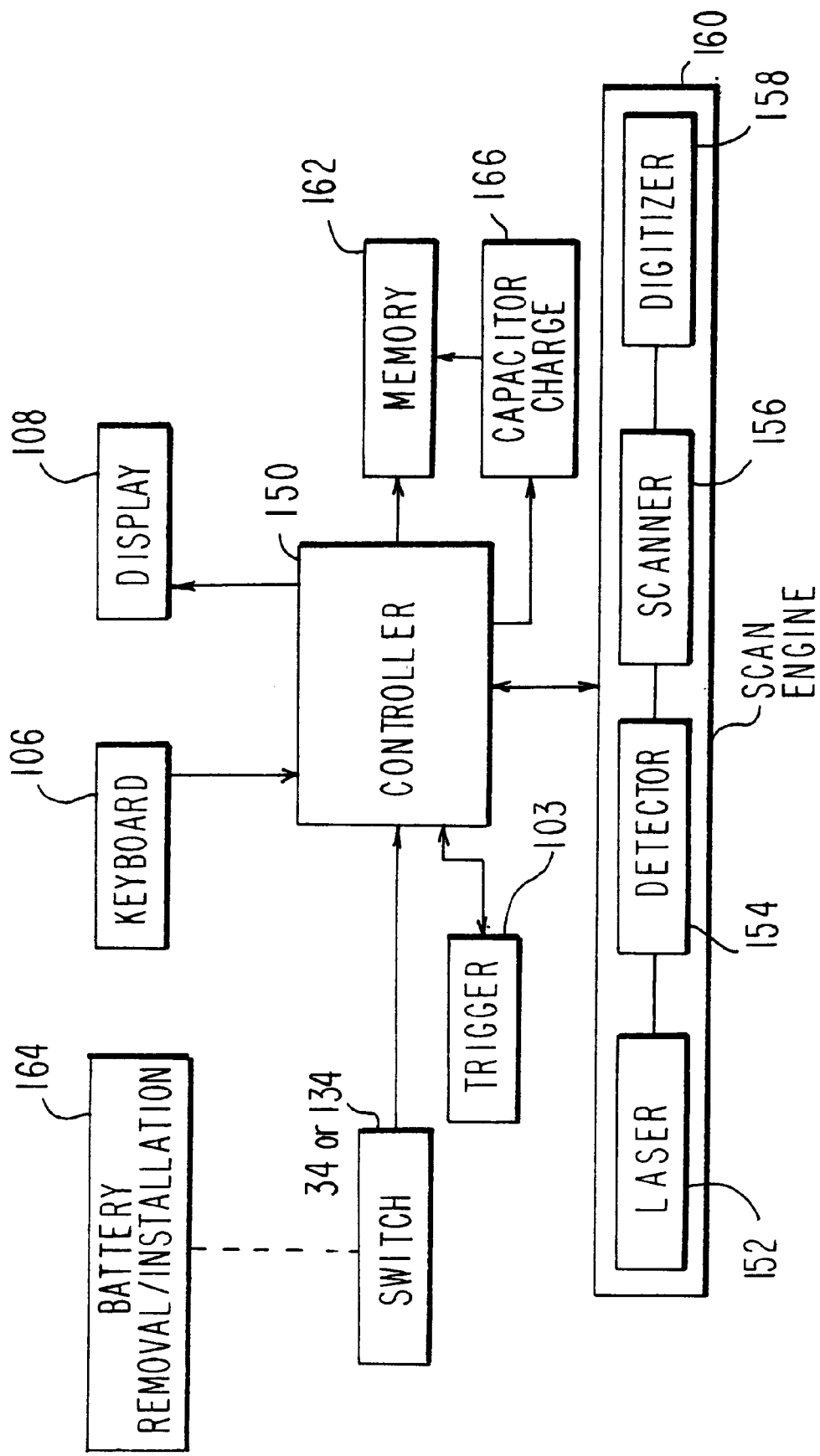
FIG. 12 is a schematic block diagram depicting the effect of battery removal/installation on the device.

FIG. 12 is a schematic block diagram generally depicting the interaction between battery removal/installation and the power shutdown/turn on features of the present invention. As described previously, the keyboard 106 and the display 108 are operatively connected to a microprocessor or controller 150. The scan engine 160 includes the laser source 152, the detector 154, the scanner 156 and the digitizer 158, and is operatively connected to the controller 150. The trigger 103 initiates the reading of the coded indicia, and is also operatively connected to the controller 150. The controller 150 stores its data, typically the decoded signal indicative of the coded indicia, in a memory 162 for subsequent downloading.

Block 164 represents the removal of battery power to the device. As discussed in connection with the device 10, the impending removal of the battery pack 12 from the recess 13 is detected in advance by the movement in one direction of the actuating portion 36 of the switch 34. As for the device 100, the impending removal of the batteries 105, 107 is forewarned by the opening of the door 112 which, in turn, causes the actuating portion 136 of the switch 134 to be moved outwardly of its casing.

In either case, the switch 34 or 134 generates a control signal which is conducted to, and detected by, the controller 150 which, in turn, executes a routine to safely and gracefully shut down the electrical components. This involves storing data in the memory 162 by insuring that a bank of capacitors 166, or a set of back-up batteries, is charged, and that this charge is supplied to the memory 162 to preserve the data stored therein.

Block 164 also schematically represents the installation of battery power to the device. In the case of device 10, the installation of the battery pack 12 within the recess is detected in advance by the movement of the actuating portion 36 of the switch 34 in the opposite direction to that described above for battery pack removal. In the case of device 100, the installation of the batteries 105, 107 is forewarned by the closing of the door 112 which, in turn, causes the actuating portion 136 of the switch 134 to be moved inwardly of its casing. In either case, the switch 34 or 134 generates a control signal having a state different from that generated during battery power removal. This different state control signal is conducted to, and detected by, the controller 150 which, in turn, executes another routine to safely and gracefully turn on the electrical components in a gradual manner to avoid voltage fluctuations.

It is to be understood that each of the elements described above, or two or more together, may also find a useful application in other types of constructions differing from the type described above.

While the present invention has been described and illustrated herein as embodied in a specific construction of a latchable battery pack and a lockable storage cradle for a battery-operated electronic device, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. An electronic device assembly, comprising:
   a) a portable housing having a front portion and a back portion as considered from the vantage point of a user when the device is in use, said housing having two end portions and an opening in said back portion thereof at the other of said end portions of said housing, and an adjacently situated detaining wall;
   b) a cradle having a compartment for receiving said back portion of said housing, said cradle having a supporting surface serving as an abutment for one of said end portions of said housing when said back portion of said housing is received in said compartment in a rest position relative to said cradle; and
   c) means for holding said housing in position relative to said cradle when said back portion thereof is received in said compartment, said holding means including a hook-shaped projection on said cradle that passes through said opening and engages behind said detaining wall in said rest position of said housing and is elastically yieldable in a predetermined direction out of the path of movement of said detaining wall as said housing is being brought into and out of said rest position thereof relative to said cradle.

2. The electronic device assembly as defined in claim 1, and further comprising
   at least one battery pack separate from said housing and removably mounted on said back portion of the latter; and
   an auxiliary compartment for receiving said battery pack.

3. The electronic device assembly as defined in claim 2, and further comprising means in said auxiliary compartment of said cradle for enabling recharging said battery pack when the latter is received in said auxiliary compartment.

4. The electronic device assembly as defined in claim 2, and further comprising at least one additional battery pack interchangeable with said one battery pack and used in alternation therewith on the housing so as to enable the respective other of them to be recharged.

5. The electronic device assembly as defined in claim 1, wherein said holding means includes a rim integral with said cradle and embracing at least a part of said one end portion of said housing when said housing is in said rest position thereof relative to said cradle.

6. The electronic device assembly as defined in claim 1, wherein said cradle includes a depressable portion that is elastically yieldable relative to the remainder of said cradle and carries said hook-shaped projection for joint movement therewith to enable the latter to clear said detaining wall when depressed.

7. The electronic device assembly as defined in claim 1, wherein said cradle includes a substantially unyieldable portion arranged at a spacing from said hook-shaped projection as considered in said predetermined direction; and further comprising means for maintaining said hook-shaped projection in place, including a shuttle mounted on said cradle for movement into and out of a latching position in which a portion thereof is interposed between said hook-shaped projection and said unyieldable portion.

8. The electronic device assembly as defined in claim 7, and further comprising means for urging said shuttle out of said latching position and toward an unlatching position thereof.

9. The electronic device assembly as defined in claim 8, wherein said urging means includes a leaf spring mounted on said shuttle for joint movement therewith, and bracing itself against said cradle when displaced out of its unlatching position.

10. The electronic device assembly as defined in claim 8, and further comprising means for locking said shuttle in said locking position thereof, including means for bounding respective openings in said shuttle and said cradle that are substantially aligned with one another in said latching position of said shuttle to enable passage of a portion of a lock therethrough.

* * * * *